(12) United States Patent
Branchesi et al.

(10) Patent No.: US 6,677,039 B2
(45) Date of Patent: *Jan. 13, 2004

(54) PROCESS FOR SPINNING THERMOWELDABLE FIBERS OBTAINED FROM POLYOLEFIN COMPOSITION

(75) Inventors: Millo Branchesi, Terni (IT); Luciano Clementini, Terni (IT); Leonardo Spagnoli, Terni (IT)

(73) Assignee: Montell North America Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/374,397

(22) Filed: Jan. 17, 1995

(65) Prior Publication Data

US 2003/0104201 A1 Jun. 5, 2003

Related U.S. Application Data

(63) Continuation of application No. 08/143,266, filed on Oct. 26, 1993, now abandoned, which is a continuation of application No. 07/505,623, filed on Apr. 6, 1990, now abandoned.

(30) Foreign Application Priority Data

Apr. 6, 1989 (IT) ............................. 20038A/89

(51) Int. Cl.⁷ ............................. D02G 3/00; B32B 9/00
(52) U.S. Cl. ..................... 428/394; 428/395; 428/364; 442/59
(58) Field of Search ................. 264/211, 211.22; 428/394, 395, 364; 442/59

(56) References Cited

U.S. PATENT DOCUMENTS

| 3,205,250 A | 9/1965 | Hechenblelkner ............ 260/461 |
| 4,104,248 A | 8/1978 | Cantatore ................... 260/45.8 |
| 4,116,926 A | 9/1978 | York .......................... 260/45.7 |
| 4,965,301 A | 10/1990 | Leininger ................... 529/101 |
| 6,475,617 B1 * | 11/2002 | Branchesi et al. ........... 428/372 |

FOREIGN PATENT DOCUMENTS

| CZ | 252501 | 10/1986 |
| EP | 184191 | 6/1986 |
| JP | 58-160333 | 9/1983 |

OTHER PUBLICATIONS

Kirk–Othmer et al., 16 *Encyclopedia of Chemical Technology* 357 (John Wiley & Sons 1981).

"Weston 618 & Weston 619, Product Data Technical Literature," (Borg–Warner Chemicals, Inc. 1982).

Legare et al., "Synthetic Fibers for Wet System and Thermal Bonding Applications", *TAPPI Seminar Notes* 57–71 (1986).

* cited by examiner

*Primary Examiner*—Cynthia H. Kelly
*Assistant Examiner*—J. M. Gray

(57) ABSTRACT

Crystalline olefin polymers in the form of granules or nonextruded particles having regular geometric form, containing one or more of the following stabilizers:
a) from 0.01 to 0.5% by weight of one or more organic phosphites or phosphonites or mixtures thereof; or
b) from 0.005 to 0.5% by weight of one or more HALS (Hindered Amine Light Stabilizer); or
c) mixtures of (a) and (b);
and optionally one or more phenolic antioxidants at a concentration not higher than 0.02% by weight.

The fibers obtained from said polyolefins have high thermoweldability and good resistance to yellowing and aging.

14 Claims, No Drawings

PROCESS FOR SPINNING THERMOWELDABLE FIBERS OBTAINED FROM POLYOLEFIN COMPOSITION

This application is a continuation of application Ser. No. 08/143,266, filed Oct. 26, 1993 and now abandoned, which is a continuation of application Ser. No. 07/505,623, filed Apr. 6, 1990 and now abandoned, which claims priority of Italian patent application No. 20038A/89, filed Apr. 6, 1989.

BACKGROUND OF THE INVENTION

The present invention relates to polyolefins containing one or more organic phosphites or phosphonites, or mixtures thereof, or HALS (Hindered Amine Light Stabilizer), or mixtures of the phosphites or phosphonites and HALS and optionally small quantities of one or more phenolic antioxidants, and thermoweldable fibers of the above mentioned stabilized resins that can be obtained through extrusion.

Within the definition of fibers as used herein are included also the manufactured products similar to fibers, such as fibrils, monofilaments, and raffia.

Polyolefin fibers are used widely in manufacturing thermally welded products, in particular of nonwoven textiles, through various technologies, the most important of which, like calendering and spun bonding, require that the fibers have the capability of thermowelding at temperatures lower than the melting point of the polyolefins from which they are made.

Moreover said fibers and manufactured articles obtained from them must be resistant to aging, yellowing, and to the color variations induced by gas fading and oxidizing phenomena in general.

Fibers obtained from polyolefins containing the most commonly used stabilizers, such as phenolic stabilizers, have little welding capability when they are submitted to a thermomechanical treatment carried out at a temperature lower than the melting point of the polyolefins.

Therefore, the mechanical properties of a nonwoven textile obtained by calendering the above mentioned fibers are poor.

In order to increase substantially the strength of thermowelding among the fibers, it has been suggested that bicomponent olefin fibers, i.e., constituted by two different polyolefins, such as polypropylene and polyethylene, are used, and the one with the lowest melting temperature is the one covering the surface of the fiber.

The results obtained this way are usually poor because of incompatibility between polyolefins of different chemical natures.

Italian patent application n. 22783 A/82 shows that the thermoweldability of polyolefins fibers can be improved by adding to the polyolefins of a 3,3',4,4'-benzophenone tetracarboxylic acid di-anhydride or one of its alkyl derivative. However, fibers obtained this way have a reduced resistance to yellowing and aging.

SUMMARY OF THE INVENTION

Unexpectedly, Applicants have found that polyolefin fibers with high thermoweldability, resistant to aging, yellowing, and color variations due to "gas fading" and oxidizing processes, can be obtained by starting with crystalline olefin polymers containing one or more of the following stabilizers:
a) from 0.01 to 0.5%, preferably from 0.05 to 0.15%, by weight of one or more organic phosphites or phosphonites or mixtures thereof; or
b) from 0.005 to 0.5%, preferably from 0.01 to 0.025%, by weight of one or more HALS; or
c) mixtures of (a) and (b);
and optionally one or more phenolic anti-oxidants at a concentration not exceeding 0.02% by weight.

DETAILED DESCRIPTION OF THE PREFERRED EMBODIMENTS

Said olefin polymers can be in granular or nonextruded particle form, having geometrically regular form, such as flakes or spheroidal particles.

The stabilizers are incorporated during the extrusion and granulation phase of the particles, or the nonextruded particles are coated or impregnated with the stabilizers at least on the surface, preferably after the polymerization stage.

The coating or impregnation of the nonextruded particles, particularly the spheroidal particles having diameters preferably between 0.5 and 4.5 mm, can be done in a variety of ways, such as, for example, the treatment with solution or suspension of the stabilizers and an optional subsequent evaporation of the solvent or suspension medium.

Alternately, in the processes for extrusion spinning described below, the particles of polymer mixed with the above-mentioned stabilizers can be introduced directly into the extruder.

In general the additivated polyolefins used to prepare the fibers according to the present invention have a melt flow index, determined according to ASTM D 1238-L, between 0.5 and 100 g/10 minutes, more preferably between 1.5 and 35 g/10 minutes, obtained directly in polymerization or through controlled free-radical degradation or visbreaking.

In order to obtain the controlled free-radical degradation, organic peroxides are added during the granulation phase or directly in the extrusion of the fibers.

The organic phosphites that can be used as additives for polyolefins according to the present invention are preferably selected from compounds with the following general formulas:

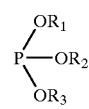

I where $R_1$, $R_2$, $R_3$, same or different, are alkyl, aryl, or arylalkyl radicals having 1–18 carbon atoms:

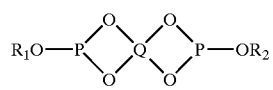

II where $R_1$ and $R_2$ have the same meaning as above;
Q is a tetravalent alkyl radical;

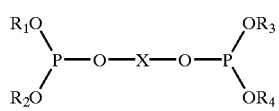

III where $R_1$, $R_2$, $R_3$, $R_4$, same or different, have the same meaning as indicated above for radicals $R_1$, $R_2$ and $R_3$, X is a bivalent alkyl, aryl, or arylalkyl radical.

Examples or organic phosphites included in the general formula I are described in U.S. Pat. Nos. 4,187,212 and 4,290,941, which are incorporated herein by reference.

Specific examples of compounds included in general formulas I, II, III are: tris(2,4-di-ter-butylphenyl)phosphite sold by CIBA GEIGY under the Irgafos 168 trademark; distearyl pentaerythritol diphosphite sold by BORG-WARNER CHEMICAL under the Weston 618 trademark; 4,4'-butylidene-bis(3-methyl-6-ter-butylphenyl-di-tridecyl) phosphite sold by ADEKA ARGUS CHEMICAL under the Mark P trademark; tris(monononylphenyl)phosphite; bis(2, 4-di-ter-butyl)pentaerythritol diphosphite, sold by BORG-WARNER CHEMICAL under the Ultranox 626 trademark.

The organic phosphonites that can be used as additives according to the present invention are preferably selected from the compounds of general formula:

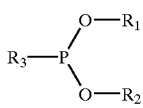

IV where $R_1$, $R_2$, $R_3$, same or different, are alkyl, aryl, or arylalkyl radicals having 1–18 carbon atoms, or $R_3$ is the radical having the formula:

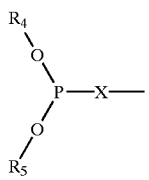

V where $R_4$ and $R_5$, same or different, have the same meaning as indicated for the $R_1$ and $R_2$ radicals, and X is a bivalent alkyl, aryl, or arylalkyl radical.

Examples of organic phosphonites included in general formula IV, which can conveniently be used according to the present invention, are described in GB patent No. 1,372,528. which is incorporated herein for reference.

A preferred example of compounds comprised in general formula IV is the stabilizer compositions, the main compound of which is tetrakis(2,4-di-ter-butylphenyl)4,4'-diphenylene diphosphonate sold by Sandoz under the Sandostab P-EPQ trademark.

The organic phosphites and phosphonites are generally used to inhibit degradation and oxidation of polyolefins in the molten state (process stabilizers), and therefore, according to known state of the art, require the addition of high quantities of phenolic stabilizers to obtain a complete stabilization.

The HALS, which according to the present invention are also used as polyolefin stabilizers, are amine compounds with steric hindrance of the amine function, which are generally used as stabilizers for polyolefins in the solid state against oxidation induced by light.

In this case as well, according to known state of the art, the addition of a high quantity of phenolic stabilizers is necessary for a satisfactory stabilization of polyolefin manufactured articles.

The HALS used according to the present invention are monomeric or oligomeric compounds containing, in the molecule, one or more substituted piperidyl groups having the following general formula:

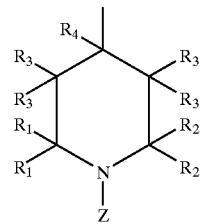

VI where the $R_1$ radicals, same or different, are $C_1$–$C_4$ alkyl radicals, or tetramethylpiperidine radicals, or the alkyl radicals form, together with the piperidyl carbon atom to which they are bonded a $C_5$–$C_9$ cycloalkyl radical; $R_2$ radicals, same or different, are hydrogen, $C_1$–$C_{18}$ alkyl radicals, $C_7$–$C_{18}$ arylalkyl radicals, or the alkyl radical form, together with the piperidyl carbon atoms to which they are bonded a $C_5$–$C_{10}$ cycloalkyl radical; $R_3$ radicals, same or different, are hydrogen, $C_1$–$C_{18}$ alkyl radicals or $C_7$–$C_{18}$ arylalkyl radicals; the $R_4$ radical is hydrogen, a $C_1$–$C_8$ alkyl radical, or a benzyl radical; Z is hydrogen, a $C_1$–$C_{18}$ alkyl, $C_1$–$C_{12}$ alkylene, $C_3$–$C_{12}$ alkenyl, $C_3$–$C_5$ alkynyl, $C_7$–$C_{18}$ arylalkyl, $C_2$–$C_4$ acyl, $C_2$–$C_{18}$ alkanoyl, $C_3$–$C_{18}$ alkoxyalkyl, $C_3$–$C_{18}$ alkenoyl, oxyl, cyanomethyl, xylylenyl radical, or a radical having a valence from 1 to 4 and containing from 1 to 4 hydroxyl groups and, optionally containing ether, ester, or heterocyclic groups, all valences of said radical being bonded to the nitrogen of piperidyl rings, or a bivalent radical containing one or more ester or amide group, or a

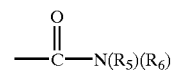

radical where $R_5$ and $R_6$ are hydrocarbon radicals.

Preferably Z is a $C_1$–$C_{12}$ alkyl, a $C_3$–$C_8$ alkenyl, $C_7$–$C_{11}$ aralkyl radical, or a bivalent radical containing one or more ester groups, wherein the valences of said radicals are bonded to the nitrogen of the piperidyl rings.

Specific examples of preferred HALS according to the present invention are compounds having the following formula:

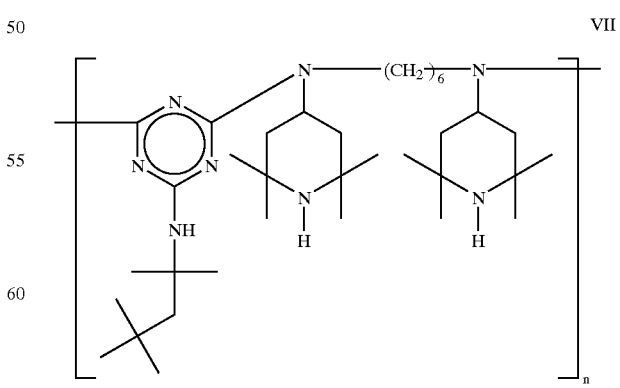

VII where n is from 2 to 20. A compound of this type is sold by CIBA-GEIGY with the Chimassorb 944 trademark.

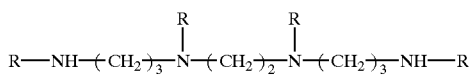

VIII sold by CIBA-GEIGY under the Chimassorb 905 trademark, where R is:

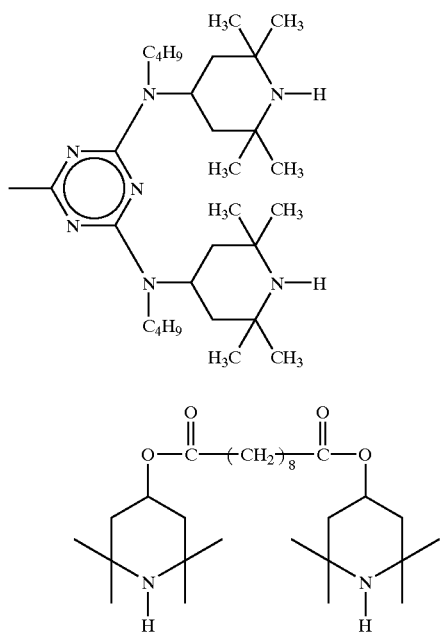

sold by CIBA-GEIGY under the Tinuvin 770 trademark;

X sold by CIBA-GEIGY under the Tinuvin 292 trademark;

XI where n is from 2 to 20, such as the compound sold by CIBA-GEIGY under the Tinuvin 622 trademark;

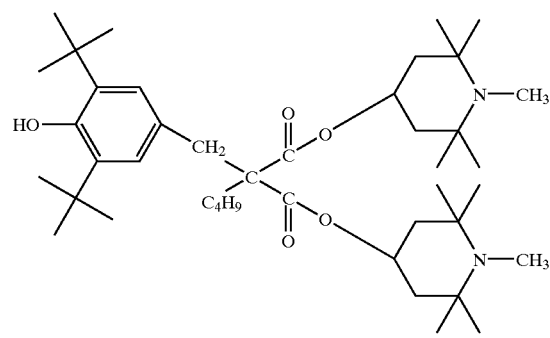

sold by CIBA-GEIGY under the Tinuvin 144 trademark;

XIII where n is from 2 to 20, such as the compound sold by CIBA-GEIGY under the Spinuvex A36 trademark; or

XIV where n is from 2 to 20, such as the compound sold by AMERICAN CYANAMID under the Cyasorb UV 3346 trademark.

As previously stated, in addition to the above-mentioned additives optionally, one or more phenolic antioxidants (sterically hindered phenols) can be used in concentration not greater than 0.02% by weight.

Examples of preferred phenolic antioxidants are: tris(4-t-butyl-3-hydroxy-2,6-dimethylbenzyl)-s-triazine-2,4,6-(1H, 3H, 5H)trione, sold by AMERICAN CYANAMID under the Cyanox 1790 trademark; calcium bi[monoethyl (3,5-di-ter-butyl-4-hydroxybenzyl)phosphonate]; 1,3,5-tris (3,5-di-ter-butyl-4-hydroxybenzyl)-s-triazine-2,4,6(1H,3H, 5H) trione; 1,3,5-trimethyl-2,4,6-tris(3,5-di-ter-butyl-4-hydroxybenzyl)benzene; pentaerythritol-tetrakis[3(3,5-di-ter-butyl-4-hydroxyphenyl)propionate], sold by CIBA-GEIGY under the following trademarks: Irganox 1425, Irganox 3114; Irganox 1330 and Irganox 1010; 2,6-dimethyl-3-hydroxy-4-ter-butyl benzyl abietate.

The additives commonly used to stabilize polyolefins, particularly Ca, mg, Zn stearates, can also be used in the preparation of the fibers according to the invention.

The polyolefins which can be used in the present invention comprise crystalline polymers or copolymers, or their mixtures, of olefins of the R—CH—CH$_2$ formula where R is a hydrogen or a C$_1$–C$_6$ alkyl radical.

Particularly used are:
1) isotactic or predominantly isotactic polypropylene;
2) high density, linear low density and low density polyethylene;
3) crystalline copolymers of propylene with ethylene or with C$_4$–C$_8$ linear or branched alpha-olefins, such as, 1-butene, 1-hexene, 1-octene, 4-methyl-1-pentene, where the total comonomer content varies from 0.05% to 20% by weight;
4) heterophasic polymers comprising (A) a homopolymer of propylene or one of the copolymers of (3), above and (B) an ethylene-propylene or ethylene-propylene-diene rubber polymer. Said heterophasic polymers being prepared according to known methods via mixing in the melted state of the above-mentioned components, or sequential polymerization in the same reactor or series of reactors, wherein (B) is present in amount from 5% to 80% by weight, and (A) in an amount from 20% to 80% by weight;
5) syndiotactic polypropylene and its copolymers and heterophasic copolymers thereof as described in (3) and (4) above.

Preferred are isotactic or predominantly isotactic polypropylene, and crystalline propylene-ethylene copolymers having a propylene content of 75%–98%.

In order to obtain thermoweldable polyolefin fibers according to the present invention, any spinning process and apparatus for melt extrusion known in the field may be used.

The present invention comprises, therefore, also the thermoweldable polyolefin fibers-containing the stabilizers in the above-mentioned quantities.

For the preparation of the fibers of the invention it is preferable to use extruders with spinnerable holes having a length/diameter ratio greater than 2.

The operation can occur at a spinning temperature between 260° C. and 300° C., and at a spinning velocity between 0.1 and 0.8 g/min per hole.

During the spinning it is possible to introduce into fibers other additives such as pigments, opacizers, fillers, etc.

The fibers obtained by extrusion are eventually submitted to stretching with stretching ratios generally between 1:1.1 and 1:8 and at temperatures between 80° C. and 150° C., preferably between 100° and 130° C., using stretching apparatus heated, i.e., with hot air, vapor, or heating plates.

The melt flow index of the fibers obtained in this manner is usually higher with respect to the values of the original polyolefins because of the spinning treatment.

Indicatively, one can obtain melt flow index values for the fibers between 4 and 150 g/10 minutes.

The fibers obtained according to the above-mentioned methods can be mono- or multifilament, and may be used for the preparation of staples or thermally adhered products, especially of nonwoven textiles.

Optionally, before the transformation to finished manufactured articles, the fibers can be submitted to refinishing treatments such as crimp, thermofixing, etc.

As previously stated, the nonwoven textiles may be prepared with a variety of known technologies, such as the calendering of staple fibers and the spun bonding, operating preferably at a temperature of 10–20° C. lower than the melt temperature of the polyolefins from which the fibers are made.

The products have high mechanical properties, because of the mechanical resistance of the thermowelding that can be obtained with the fibers of the present invention.

The above-mentioned fibers, in fact, are characterized by a high thermowelding strength, determined according to the method described in the examples. Preferably this parameter varies from 2 to 5 N.

Moreover, the manufactured articles derived from the fibers of the present invention show satisfactory resistance to aging and color changes.

Following are some examples which are given to illustrate but not to limit the invention.

EVALUATION OF THE PROPERTIES OF THE FIBERS PREPARED IN THE EXAMPLES

Thermowelding Strength

Usually, in order to evaluate the thermowelding ability of the fibers it is customary to produce a nonwoven via calendering under special conditions, and measure the stress necessary to tear the nonwoven in a direction transverse to the calendering one, operating according to ASTM 1682.

The stress value determined in this manner is considered a measure of the ability of the fiber to thermoweld.

The result obtained, however, is influenced substantially by the finishing characteristics of the fibers (crimp, finish, thermofixing, etc.) and the condition of preparation of the card veil fed to the calender.

In order to prevent these inconveniences and obtain a more direct evaluation of the thermowelding characteristics of the fibers, a method has been devised which is schematically described below.

Some samples were prepared starting with a rove of 400 tex (ASTM D 1577-7) and 0.4 m long, made up of continuous fibers.

After having twisted said rove eighty times, the two extremities were joined, obtaining a manufactured article where the two halves of the rove were twisted around each other as in a rope.

The two twisted roves were thermowelded at a temperature of about 15° C. lower than the melting point of the polyolefin from which the fibers are made, operating for a predetermined period of time with a thermowelder of the type commonly used in laboratories for the study of thermoplastic films.

The average force required to detach the two roves of each sample at the thermowelded point was measured with a dynamometer.

The result, expressed in N, was obtained by averaging out at least 8 measurements, and it expressed the thermowelding strength of the fibers.

In the following examples a Sentinel model 12-12 AS thermowelder was used, operating with thermowelding periods of 1 second and a thermowelding pressure of about 2.85 Kg/cm$^2$.

Color Changes

The IXSO/TC38/SC1 norm was used at 60° C. and at 130° C. to measure the resistance of fibers to colorations induced by gas fading.

The resistance to colorations induced by oxidation phenomena was measured by keeping the fibers in an oven at 90° C. for 2 days, and the coloration was evaluated based on the gray scale, as described in the above-mentioned norm.

Resistance to Artificial Aging

This property was evaluated by submitting the fibers to accelerated aging in a ventilated oven at 110° C., according to ASTM D 3045-74.

The time (in days) necessary to reach total decay of the mechanical properties (embrittlement) was determined.

EXAMPLES 1–14 AND COMPARATIVE EXAMPLES 1–8

5 Kg. samples of polypropylene in flake form at controlled granulometry (average diameter of particles 450 m) having the following characteristics:

| | |
|---|---|
| residue insoluble in boiling heptane | 96% |
| number average molecular weight | 65,700 |
| weight average molecular weight | 320,000 |
| melt flow index | 12.2 g/10 mm |
| ashes at 800° C. | 160 ppm | and calcium stearate at a concentration of 0.05% by weight, were prepared by mixing.
To each sample were added the stabilizers listed in Table 1, through a Henschell type speed mixer for powders.

The resultant mixture, 1 thus were granulated by extrusion at 220° C., and the granules were spun in a system having the following main characteristics:

- extruder with 25 mm diameter screw and length/diameter ratio=25, and a capacity from 1.0 to 6.0 Kg/h;
- spinner with 19 holes with a diameter of 0.4 mm and length/diameter ratio=5;
- metering pump;
- quenching system with air at a temperature of 18–20° C.;
- gathering device with a speed of 500 to 2000 m/min.;
- fiber stretching device with hot roller at speed varying from 30 to 300 m/min, and steam stretch oven.

The conditions used for spinning and stretching were:
a) temperature of spinner=290° C.;
b) hole capacity 0.45 g/min.;
c) gathering speed 1500 m/min;
d) stretch ratio 1:1.5.

The main mechanical characteristics of the fibers thus obtained are within the following ranges:

- titre (ASTM D 1577-79) 1.9–2.2 dtex
- strenghth (ASTM D 2101-82) 15–20 cN/tex
- elongation to break (ASTM D 2101-82) 300–400%.

In table 1 are shown, for all the examples and comparative examples, the thermowelding strength (thermowelding temperature=150° C.), the accelerated aging resistance values (in days), and the color changes compared to the gray scale.

In particular, for the color changes, the first result reported in Table 1 is relative to the change induced by gas fading at 60° C. after 4 cycles, the second result is relative to the change induced by gas fading at 130° C. after 15 minutes, the third to the coloration induced by oxidizing phenomena, determined as described above.

EXAMPLES 15–17 AND COMPARATIVE EXAMPLE 9

5 Kg. samples were prepared of polypropylene in the form of spheroidal particles with diameter between 2 and 3 mm and having the following characteristics:

| | |
|---|---|
| insoluble in xylene at 25° C. | 96.5% |
| number average molecular weight | 64,000 |
| weight average molecular weight | 325,000 |
| melt flow index | 11.8 g/10 min. |
| ashes at 800° C. | 150 ppm |

Each of these samples was surface additivated (or stabilized) with the stabilizers shown in Table 2. The additivation was done by treatment with aqueous suspensions and subsequent drying. The polymer particles of each sample were then further additivated with 0.05 wt % calcium stearate.

The polymer samples thus obtained was spun according to methods described in the preceding examples.

The mechanical properties of the fibers were within the ranges described in the preceding examples.

In Table 2 are shown, for all the examples and comparative examples, the thermowelding strength (thermowelding temperature=150° C.), the accelerated aging resistance values in days, and color changes, determined as per the preceding examples.

EXAMPLE 18

5 Kg of random crystalline propylene/ethylene copolymer containing 2.3% by weight of ethylene, was additivated with:

- 0.05% by weight calcium stearate;
- 0.05% by weight of Sandostab P-EPQ;
- 0.01% by weight of Chimassorb 944;

and then it was granulated by extrusion.

The methods employed were the same as described in exmples 1–14.

The granules were then spun with the same methods described in examples 1–14.

The mechanical properties of the fibers thus obtained were within the ranges described above. The thermowelding strength (thermowelding temperature=140° C.) was 3.8 N.

The time of resistance to accelerated aging and the color changes, measured as described above, were respectively 6 and 5 days, and 5; 5, respectively.

EXAMPLES 19–23

Using the same procedure and same propylene homopolymer of examples 1–14, samples in the form of extruded granules were prepared containing the following additives (percentage by weight):

- 0.05% calcium stearate
- 0.015% Chimassorb 944
- 0.04% Irgafos 168
- 0.01% Irganox 1076.

The granules were spun according to the methods of examples 1–14 using the gathering speed and the stretching ratios indicated in Table 3 for each example.

In the same table are also shown the titre, strength, and elongation at break values of the fibers obtained, as well as the thermowelding strength (thermowelding temperature= 150° C.), resistance to aging and color change values, determined as described in the preceding examples.

TABLE 1

| | Additives | % by weight | Thermowelding strength N | Accelerated aging days | Colour change |
|---|---|---|---|---|---|
| Example No. | | | | | |
| 1 | Weston 618 | 0.05% | 2.5 | 2.0 | 5; 5; 5 |
| 2 | Sandostab P-EPQ | 0.05% | 2.8 | 2.0 | 5; 5; 5 |
| 3 | Irgofos 168 | 0.05% | 3.0 | 2.0 | 5; 5; 5 |
| 4 | Chimassorb 944 | 0.02% | 3.0 | 4.0 | 5; 5; 5 |
| 5 | Chimassorb 944 | 0.05% | 3.0 | 6.0 | 5; 5; 5 |
| 6 | Tinuvin 622 | 0.02% | 3.0 | 4.0 | 5; 5; 5 |
| 7 | Tinuvin 770 | 0.02% | 3.0 | 4.0 | 5; 5; 5 |
| 8 | Tinuvin 144 | 0.02% | 3.0 | 4.0 | 5; 5; 5 |
| 9 | Tinuvin 144 | 0.05% | 3.0 | 5.0 | 5; 5; 5 |
| 10 | Chimassorb 905<br>Sandostab P-EPQ | 0.02%<br>0.05% | 3.5 | 6,0 | 5; 5; 5 |
| 11 | Chimasorb 944<br>Irgafos 168 | 0.02%<br>0.05% | 4.0 | 6.0 | 5; 5; 5 |
| 12 | Chimassorb 944<br>Irgafos 168 | 0.02%<br>0.05% | 4.2 | 10 | 5; 5; 5 |
| 13 | Chimassorb 944<br>Tinuvin 622 | 0.05%<br>0.02% | 4.0 | 6.0 | 5; 5; 5 |
| 14 | Irgafos 168<br>Sandostab PEPQ<br>Tinuvin 144 | 0.05%<br>0.05%<br>0.02% | 3.5 | 6.0 | 5; 5; 5 |
| Comparative Example No. | | | | | |
| 1 | Irganox 1010 | 0.05% | 1.2 | 2.0 | 2; 2; 2 |
| 2 | Irganox 1425 | 0.05% | 1.4 | 4.0 | 3; 3; 3 |
| 3 | Irganox 3114 | 0.05% | 1.5 | 2.0 | 4; 3;:3 |
| 4 | Cyanox .1790 | 0.05% | 1.5 | 3.0 | 4; 3; 2 |
| 5 | Irganox 1010 | 0.05% | 1.0 | 2.0 | 2; 2; 2 |
| 6 | Irgafos 168<br>Irganox 1010<br>Chiwassorb 944 | 0.05%<br>0.05%<br>0.05% | 1.0 | 10 | 2; 2; 2 |
| 7 | Tinuvin 622 | 0.8% | 1.8 | 15 | 4; 4; 4 |
| 8 | Tinuvin 622<br>Sandostab P-EPQ | 0.8%<br>0.7% | 2.5 | 20 | 4; 4; 5 |

TABLE 2

| | Additives | % by weight | Thermowelding strength | Accelerated aging days | Colour change |
|---|---|---|---|---|---|
| Example No. | | | | | |
| 15 | Chimassorb 944<br>Irgafos 168 | 0.02%<br>0.05% | 4.0 | 6 | 5; 5; 5 |
| 16 | Sandostab P-EPQ<br>Tinuvin 144 | 0.05%<br>0.02% | 3.0 | 2 | 5; 5; 5 |
| 17 | Irgafos 168 | 0.05% | 3.8 | 6 | 5; 5; 5 |
| Comparative Example No. | | | | | |
| 9 | Irganox 1010 | 0.05% | 1.2 | 2 | 2; 2; 2 |

TABLE 3

| Example No. | Gathering speed m/min. | Stretching ratio | Title dtex | Strength | Elongation at break % | Thermowelding strength N | Accelerated aging days | Colour change |
|---|---|---|---|---|---|---|---|---|
| 19 | 2000 | 1:1.25 | 1.9 | 15 | 400 | 3.2 | 5 | 5; 5; 5 |
| 20 | 1500 | 1:1.7 | 2.1 | 18 | 350 | 3.1 | 5 | 5; 5. 5 |
| 21 | 1000 | 1:2.5 | 2.0 | 24 | 280 | 3.3 | 6 | 5; 5; 5 |

TABLE 3-continued

| Example No. | Gathering speed m/min. | Stretching ratio | Title dtex | Strength | Elongation at break % | Thermowelding strength N | Accelerated aging days | Colour change |
|---|---|---|---|---|---|---|---|---|
| 22 | 800 | 1:3.1 | 1.95 | 27 | 200 | 3.1 | 6 | 5; 5; 5 |
| 23 | 600 | 1:4.1 | 2.2 | 32 | 100 | 3.0 | 5 | 5; 5; 5 |

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

What is claimed is:

1. A thermally welded manufactured article prepared from thermoweldable polyolefin fibers comprising an olefin crystalline polymer containing as stabilizer(s), based on the total weight of the olefin crystalline polymer and stabilizer(s)

a) from 0.01 to 0.5% by weight of at least one member of the group consisting of organic phosphites and phosphonites;
    b) from 0.005 to 0.5% by weight of one or more HALS;
    wherein any phenolic antioxidant is either absent or present in concentration not greater than 0.02% by weight;
    the thermowelding being performed by operating at a temperature lower than a melt temperature of the polyolefin constituting the fibers.

2. The thermally welded manufactured article of claim 1, form of nonwoven textiles prepared by calendering or spunbonding said thermoweldable polyolefin fibers.

3. The thermally welded manufactured article of claim 1, wherein said polymer is a homopolymer or copolymer of an olefin having a formula R—CH=CH$_2$, where R is a hydrogen atom or a C$_1$–C$_6$ alkyl radical.

4. The thermally welded manufactured article of claim 3, wherein said polymer is a member selected from the group consisting of isotactic polypropylene, prevailingly isotactic polypropylene, and propylene-ethylene crystalline copolymers containing prevalently propylene.

5. The thermally welded manufactured article of claim 1, wherein the stabilizer (a) content varies from 0.05 to 0.15% by weight, and the stabilizer (b) content varies from 0.01 to 0.025% by weight.

6. The thermally welded manufactured article of claim 1, wherein the organic phosphite or phosphites are selected among compounds having the general formulas:

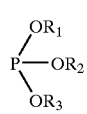

where R$_1$, R$_2$, R$_3$, equal or different, are alkyl, aryl, or arylalkyl radicals with 1 to 18 carbon atoms:

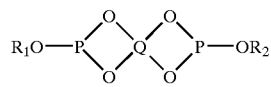

where R$_1$ and R$_2$, equal or different, are radicals having the above-mentioned meaning; and Q is a tetravalent alkyl radical;

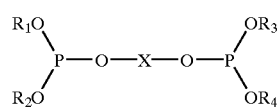

where R$_1$, R$_2$, R$_3$, R$_4$, equal or different, are radicals with the meaning indicated for the R radicals, X is an alkyl, aryl, or arylalkyl bivalent radical.

7. The thermally welded manufactured article of claim 6, wherein the organic phosphite or phosphites is at least one member selected from the group consisting of tris(2,4-di-ter-butylphenyl)phosphite; distearyl pentaerythritol diphosphite; 4,4'-butylidene-bis (3-methyl-6—ter-butylphenyl-di-tridecyl)phosphite; tris(mononylphenyl)phosphite; and bis (2,4-di-ter-butyl)pentaerythritol diphosphite.

8. The thermally welded manufactured article of claim 1, wherein the organic phosphonite or phosphonites are selected among compounds of the general formula:

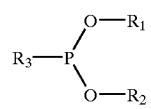

where R$_1$, R$_2$, R$_3$, equal or different, are alkyl, aryl, or arylalkyl radicals with 1 to 18 carbon atoms, or the R$_2$ radical is substituted by a grout:

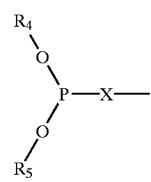

where R$_4$ and R$_5$, equal or different, are radicals with the meaning above indicated for the R radicals, and X is an alkyl, aryl, or arylalkyl bivalent radical.

9. The thermally welded manufactured article of claim 6, wherein tetrakis[2,4-di-ter-butylphenyl]4,4'-diphenyl phosphonite is used as the organic phosphonite.

10. The thermally welded manufactured article of claim 1, wherein the HALS are selected among monomer or oligomer compounds which contain in the molecule one or more substituted piperidine groups having the following general formula:

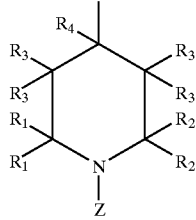

VI where the $R_1$ radicals, equal or different, are $C_1$–$C_4$ alkyl radicals, or tetramethylpiperidine radicals, or the alkyl radicals form with the piperidine carbon atoms to which they are linked a $C_5$–$C_9$ cycloalkyl radical; the $R_2$ radicals, equal or different, are hydrogen or $C_1$–$C_{18}$ alkyl radicals, $C_7$–$C_{18}$ arylalkyl radicals, or the alkyl radical form with the piperidine carbon atoms to which they are linked a $C_5$–$C_{10}$ cycloalkyl radical; the $R_3$ radicals, equal or different, are hydrogen, or $C_1$–$C_{18}$ alkyl radicals or $C7$–$C_8$ arylalkyl radicals; the $R_4$ radical is hydrogen, or a $C_1$–$C_8$ alkyl radical, or a benzyl radical;

Z is hydrogen, or a $C_1$–$C_{18}$ alkyl, $C_1$–$C_{12}$ alkylene, $C_3$–$C_{12}$ alkenyl, $C_3$–$C_5$ alkynyl, $C_3$–$C_{18}$ arylalkyl, $C_2$–$C_4$ acyl, $C_2$–$C_{18}$ alkanoyl, $C_3$–$C18$ alkoxyalkyl, $C_3$–$C_{18}$ alkenoyl, oxylic, cyanomethyl, xylylenyl radical, or a radical having a 1 to 4 valence and containing from 1 to 4 hydroxyl groups and, optionally, ether, ester, or heterocyclic groups, being the valences of said radical linked to the nitrogen of piperidine groups, or a bivalent radical containing one or more ester or amide groups, or a —C—N ($R_5$) ($R_6$) radical where $R_5$ and $R_6$ are hydrocarbon radicals.

11. The thermally welded manufactured article of claim 1, wherein the HALS is or are selected among the compounds with the formulas:

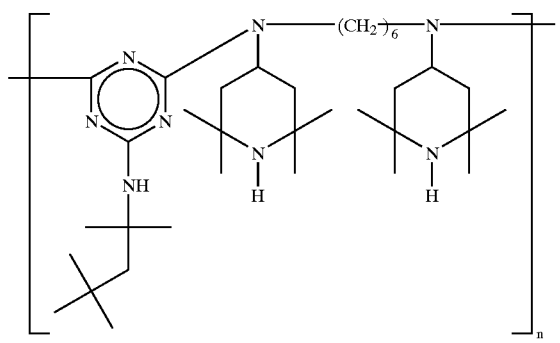

VII where n varies from 2 to 20;

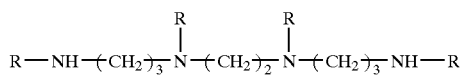

VIII where R is:

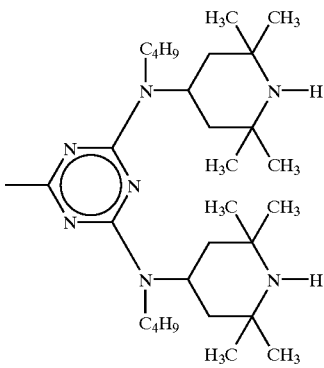

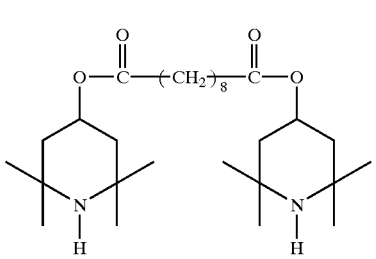

IX

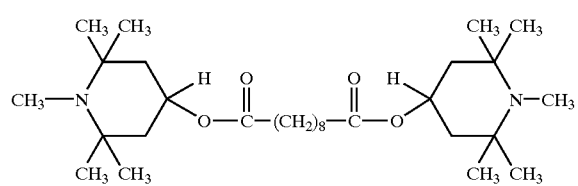

X

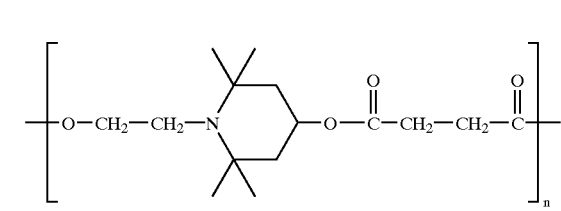

XI where n varies from 2 to 20,

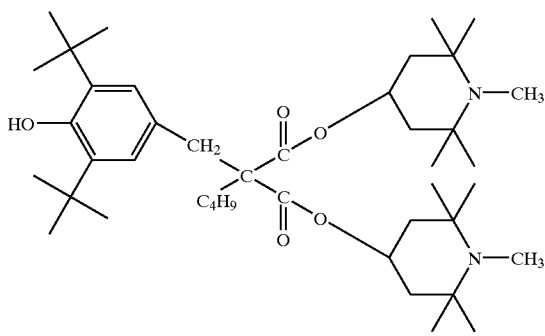

XII

-continued

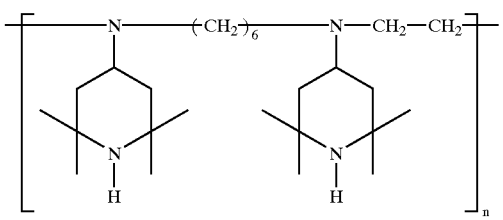

XIII where n varies from 2 to 20, and

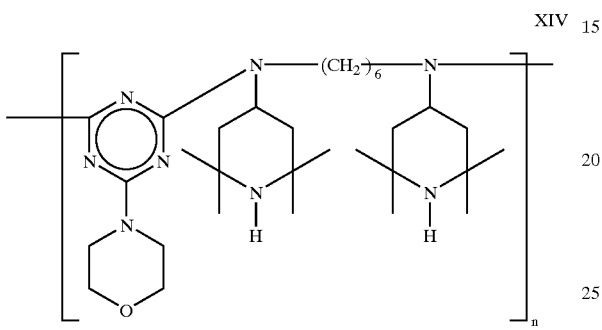

XIV where n varies from 2 to 20.

12. The thermally welded manufactured article of claim 1, wherein the phenolic antioxidant or antioxidants are selected from the group consisting of tris (4-t-butyl-3-hydroxy-2,6-dimethylbenzyl)-s-triazine-2,4,6-(1H,3H,5H)trione; calcium bi[monoethyl(3,5-di-ter-butyl-4-hydroxybenzyl)phosphonate]; 1,3,5-tris (3,5-di-ter-butyl-4-hydroxybenzyl)s-triazine-2,4,6-(1H,3H,5H)trione; 1,3,5-trimethyl-2,4,6-tris (3,5-di-ter-butyl-4-hydroxybenzyl)benzene; pentaerythritil-tetrakis[3-(3,5-di-ter-butyl-4-hydroxyphenyl)propionate]; and 2,6-dimethyl-3-hydroxy-4-ter-butyl benzyl abietate.

13. A thermally welded manufactured article prepared from thermoweldable polyolefin fibers having a thermoweldable strength from 2 to 5 N, said polyolefin fibers comprising an olefin crystalline polymer containing as stabilizer(s), based on the total weight of the olefin crystalline polymer and stabilizer(s):

a) from 0.01 to 0.5% by weight of at least one member of the group consisting of organic phosphites and phosphonites;

b) from 0.005 to 0.5% by weight of one or more HALS;

wherein any phenolic antioxidant is either absent or present in concentration not greater than 0.02% by weight;

the thermowelding being performed by operating at a temperature lower than a melt temperature of the polyolefin constituting the fibers.

14. A thermally welded manufactured article prepared from thermoweldable polyolefin fibers comprising an olefin crystalline polymer containing as stabilizer(s), based on the total weight of the olefin crystalline polymer and stabilizer (s)

a) from 0.01 to 0.5% by weight of at least one member of the group consisting of organic phosphites and phosphonites;

b) from 0.005 to 0.5% by weight of one or more HALS; or c) mixtures of a) and b);

wherein any phenolic antioxidant is either absent or present in concentration not greater than 0.02% by weight;

the thermowelding being performed by operating at a temperature lower than a melt temperature of the polyolefin constituting the fibers.

* * * * *